(12) United States Patent
Lee et al.

(10) Patent No.: US 6,931,189 B2
(45) Date of Patent: Aug. 16, 2005

(54) OPTICAL WAVEGUIDES AND OPTICAL DEVICES WITH OPTICAL WAVEGUIDES

(75) Inventors: Youngkun Lee, Hachioji (JP); Kazuhiko Hosomi, Tachikawa (JP); Toshio Katsuyama, Ome (JP); Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 10/321,506

(22) Filed: Dec. 18, 2002

(65) Prior Publication Data

US 2003/0202764 A1 Oct. 30, 2003

(30) Foreign Application Priority Data

Apr. 24, 2002 (JP) ........................................ 2002-121802

(51) Int. Cl.$^7$ .............................. G02B 6/10; G02B 6/26
(52) U.S. Cl. ........................................ 385/128; 385/43
(58) Field of Search .......................... 385/31, 123–125, 385/129, 132, 43

(56) References Cited

U.S. PATENT DOCUMENTS

| | | | | |
|---|---|---|---|---|
| 5,802,236 A | * | 9/1998 | DiGiovanni et al. | 385/127 |
| 6,445,862 B1 | * | 9/2002 | Fajardo et al. | 385/125 |
| 2001/0012149 A1 | * | 8/2001 | Lin et al. | 359/344 |
| 2003/0068152 A1 | * | 4/2003 | Gunn, III | 385/129 |

FOREIGN PATENT DOCUMENTS

| | | | | |
|---|---|---|---|---|
| JP | 2001-004877 | * | 12/2001 | G02B/6/42 |

OTHER PUBLICATIONS

U.S. Appl. No. 60/318,446.*
Love, "Application of a Low–loss Criterion to Optical Waveguides and Devices," Aug. 1989, IEE Proceedings, vol. 136, pp. 225–228.*
The 48th Applied Physics Related Association Lecture Meeting 30a–YK–11.
Japanese Patent Application Laid–Open No. 2001–4887.
IEEE Photonic Technology Letters, published in 2001, vol. 13, 52nd page.
Proceedings C–358 of the Institute of Electronics, Information and Communication Engineers General Meeting (1995), 358th page.
Japanese Patent Application Laid–Open No. 2001–4869.
IEEE proceedings, written by J.D. Love and published in 1989, vol. 136, 235th page.
IEEE Photonics Technology Letters, vol. 6, No. 9 Sep. 1994, 1080th page.
Simon Ramo et al: "Field and Wave in Communication Electronics", published by John Wily and Sun Press, 294th page.
Photonic Crystals, written by J.D. Joannopoulos et al. and published in 1995 by Princeton University Press.

* cited by examiner

Primary Examiner—Kaveh C. Kianni
Assistant Examiner—Christopher M. Kalivoda
(74) Attorney, Agent, or Firm—Antonelli, Terry, Stout & Kraus, LLP

(57) ABSTRACT

The invention provides an optical waveguide for enabling the reduction of a coupling loss caused by difference in the size of a mode field diameter between optical waveguide modes different in the mode field diameter and a coupling loss caused by reflection on a boundary caused by the difference of media and an optical device using it. Structure provided with a mode field diameter converter provided with an antireflection part required to reduce a coupling loss between a microoptical circuit and a single mode optical fiber is integrally produced using effective refractive index control based upon photonic crystal structure.

6 Claims, 11 Drawing Sheets

OPTICAL WAVEGUIDES AND OPTICAL DEVICES WITH OPTICAL WAVEGUIDES

BACKGROUND OF THE INVENTION

The present invention relates to optical device technique including an optical waveguide and a microoptical circuit.

The coupling efficiency of two optical waveguide modes is in proportion to the superposition of the distribution of an electric field (hereinafter called a mode field) in a plane perpendicular to a traveling direction in each optical waveguide mode. Therefore, in case the size of a mode field of the two optical waveguide modes or each distribution pattern is different, the coupling efficiency is small. Coupling efficiency is increased by converting the size and the pattern of either mode field so that it is equal to those of another optical waveguide mode.

Some well-known examples using the method exist. (1) There is an external device coupled waveguide of a low-loss Si thin line optical waveguide acquired by varying the size of the sections of a core in a shape reverse to a taper as described in a document of the 48th Applied Physics Related Association Lecture Meeting 30a-YK-11. In the case of the reversely tapered core, the size of a mode field is made larger by reducing the cross section of the core of the optical waveguide. Or the size of the mode field is reduced by increasing the cross section of the core of the optical waveguide. (2) There is an optical waveguide composed of a tapered core and a clad layer formed by metal or photonic crystal material as described in Japanese Patent Application Laid-Open No. 2001-4887. In the case of the tapered core, the size of a mode field is reduced by reducing the cross section of the core of the optical waveguide. Or the size of the mode field is made larger by increasing the cross section of the core of the optical waveguide. (3) For a device using an optical fiber described on the 52nd page, vol. 13 of IEEE Photonic Technology Letters published in 2001, there is a mode field converting device in which a clad layer made of an airy silica fiber and a core layer are both tapered. (4) The 358th page of proceedings C-358 of the Institute of Electronics, Information and Communication Engineers General Meeting (1995) discloses optical waveguide structure in which a mode size converter of a semiconductor laser provided with the mode size converter is provided with both a tapered core and a reversely tapered core. (5) In Japanese Patent Application Laid-Open No. 2001-4869, an optical coupling device that varies spot size in a different class utilizing chromatic dispersion proper to a photonic crystal is proposed.

On the 235th page, vol. 136 of IEEE proceedings written by J. D. Love and published in 1989, a conditional expression which is the criterion of judgment not to change field distribution when the size of a mode field is varied is described. The conversion of only the size of a mode field without changing field distribution is called adiabatic mode conversion.

On the 1080th page, vol. 9 of Microwave and Optical Technology Letters (1994), a method of spatially controlling the thickness in a direction of crystal growth of a semiconductor using selective crystal growth is described.

Next, in case light is incident on the interface of two media different in a refractive index, reflection is caused. To reduce the reflection, an antireflection film is provided. It is known that to eliminate reflection caused in case light is incident on a medium 2 having a refractive index $n_2$ from a medium 0 having a refractive index $n_0$, a medium 1 having a refractive index $n_1$ and thickness L which meets the following conditions has only to be inserted between the media 1 and 2 (refer to the 294th page in sixth and eighth chapters of the second edition of "Field and Wave in Communication Electronics" written by Simon Ramo et al and published by John Wily and Sun Press).

$$n_1^2 = n_0 \cdot n_2 \tag{1}$$

$$k_1 \cdot L = \pi/2 \tag{2}$$

In the case, $k_1$ denotes the wave number of light in the medium 1.

A microoptical circuit using a photonic crystal optical waveguide and a microguide optical waveguide attracts attention.

A photonic crystal means periodic structure having a period equivalent to the wavelength of light and formed by two types of media having much difference in a refractive index. A photonic crystal waveguide in which the intense confinement of light is enabled can be produced by injecting a defect into periodicity. For the photonic crystal optical waveguide, there are a line-defect waveguide in which defects are physically connected and a coupled-defect waveguide in which detects are optically connected though detects are not physically connected. In such an optical waveguide, even if the waveguide is greatly curved, an optical propagational loss (a flexural loss) by flexure is very small. As a result, it is expected that if the optical waveguide is used, a very small optical circuit is enabled.

The microguide optical waveguide means an optical waveguide having much difference in a refractive index between a core and a clad of the optical waveguide. Normally, as the difference in a refractive index between the core and the clad is 1 or more and the confinement of light is intense, the flexural loss is small as in the photonic crystal optical waveguide and the microguide optical waveguide is expected as a microoptical circuit.

When the optical waveguide in which the confinement of light is intense is supposed to be a single mode optical waveguide in which only a fundamental guided mode exists, its mode field diameter is 1 μm or less. In this case, the fundamental mode means an optical waveguide mode in which a pattern of electric field strength has s single peak. The mode field diameter is defined as a diameter of an electric field region including $1/e^2$ which is the maximum value of the electric field strength distribution of a mode or more.

A single mode optical fiber is used for the input/output of light to/from an optical circuit. An optical fiber means an optical waveguide having concentric structure provided with a core in the center, a clad around the core and further, a protective layer around the clad. The single mode optical fiber means an optical fiber in which only one optical waveguide mode of a fundamental mode exists. Currently, for a medium for transmitting an optical signal of an optical communication system, the single mode fiber is used. In the single mode fiber, as difference in a refractive index between a core and clad is small, the confinement of light is weak and as a result, the existing mode field diameter of the fundamental mode is approximately 10 μm.

Therefore, in case light is directly input to the microoptical circuit provided with the photonic crystal optical waveguide or the microguide optical waveguide from the single mode fiber or in case light is directly output to the single mode fiber from the microoptical circuit, a large coupling loss is caused because there is much difference between the mode field diameter of the single mode fiber and the mode field diameter of the microoptical circuit. In addition to the coupling loss caused by the difference in the size of the mode field diameter, a coupling loss by reflection on a boundary caused by difference in a medium between the optical fiber and the microoptical circuit also exists.

For a method of reducing the coupling loss caused by the difference in the mode field diameter, there are the methods described in (1) to (5) of the prior art. The methods (1) to (4) include plural complex working processes for forming the tapered core, forming the buried waveguide and forming the film. In the methods (2) and (3), as the tapered core is provided, plural waveguide modes exist as the diameter of the core is increased. Therefore, in case light is input to the core the diameter of which is large from the single mode fiber, a higher order optical waveguide mode is excited in addition to the fundamental guided mode and a new coupling loss is caused. In (5), in addition to the complexity of working, the difficulty of optical alignment is also caused.

SUMMARY OF THE INVENTION

Then, the invention provides an optical waveguide in which a coupling loss caused by difference in the size of a mode field diameter between optical waveguide modes different in the mode field diameter and a coupling loss by reflection on a boundary caused by difference between media are reduced and optical device technique using the optical waveguide.

To achieve the object, in the invention, an intermediate member is provided to transmit light from a first transmission member in which only a fundamental mode exists to a second transmission member in which only a fundamental mode of size different from that of the first transmission member exists. The intermediate member is composed of a core and a clad having photonic crystal structure. In the clad, the photonic crystal structure is varied so that the effective refractive index is spatially varied. As a result, as difference in a refractive index between the core and the clad is spatially varied and the intensity of the confinement of light is spatially varied, the field diameter of an optical waveguide mode can be spatially varied.

The fundamental mode of the first member is converted to the fundamental mode of the second member using the intermediate member. The fundamental mode of the second member is converted to the fundamental mode of the first member, which is a reverse process. To make only the fundamental mode exist in the intermediate member, the photonic crystal structure of the clad is varied so that difference in a refractive index between the core and the clad is increased as light advances from a region having a large mode field diameter to a region having a small mode field diameter.

A region for preventing reflection on a boundary using photonic crystal structure is provided to an input/output part of the intermediate member.

The representative examples of the configuration of the invention will be described below.

(1) An optical waveguide provided with a core and a clad formed by a photonic crystal member and characterized in that the effective refractive index of the clad is spatially varied by changing the structure of the photonic crystal member and a mode field diameter which is electric field strength distribution in a plane perpendicular to a traveling direction in an optical waveguide mode is spatially varied.

(2) An optical waveguide provided with the configuration and characterized in that a fundamental guided mode exists as the optical waveguide mode and a mode field diameter of the fundamental guided mode is spatially varied.

(3) An optical waveguide provided with the configuration and characterized in that the photonic crystal structure is composed of a one-, two- or three-dimensional photonic crystal.

(4) An optical waveguide provided with the configuration and characterized in that the cross sections of the core are spatially varied in a tapered shape or in a reversely tapered shape in a traveling direction in the optical waveguide mode.

(5) An optical waveguide provided with the configuration and characterized in that a one-, two- or three-dimensional photonic crystal structure is provided to the input/output side of the optical waveguide and a region for preventing the reflection of light is provided.

(6) An optical device provided with a first transmission member in which a fundamental guided mode exists, a second transmission member in which a fundamental guided mode of size different from that of the first transmission member exists and an intermediate member provided to transmit light from the first transmission member to the second transmission member and composed of a core and a clad having photonic crystal structure and characterized in that the intermediate member changes the photonic crystal structure so that the effective refractive index of the clad is spatially varied and spatially changes a mode field diameter which is electric field strength distribution in a plane perpendicular to a traveling direction in an optical waveguide mode.

(7) An optical device provided with the configuration and characterized in that the fundamental guided mode of the first transmission member is converted to the fundamental guided mode of the second transmission member or the fundamental guided mode of the second transmission member is converted to the fundamental guided mode of the first transmission member by changing the photonic crystal structure of the intermediate member.

(8) An optical device provided with the configuration and characterized in that the intermediate member changes the photonic crystal structure of the clad so that difference in a refractive index between the core and the clad is increased as light advances from a region having a large mode field diameter to a region having a small mode field diameter.

(9) An optical device provided with the configuration and characterized in that photonic crystal structure is provided to the input/output side of the intermediate member and a region for preventing the reflection of light on an interface between the first transmission member and the second transmission member is provided.

(10) An optical device provided with the configuration and characterized in that the intermediate member is provided with a line-defect waveguide or a coupled-defect waveguide.

DETAILED DESCRIPTION OF THE PREFERRED EMBODIMENTS

Referring to the attached drawings, embodiments of an optical waveguide and an optical device using it according to the invention will be described in detail below.

First Embodiment

An embodiment of a mode field diameter converting optical waveguide provided with a mode field diameter converter which can spatially vary the effective refractive index of a clad by spatially changing photonic crystal structure and can spatially change the field diameter of an optical waveguide mode and an antireflection region formed by photonic crystal structure will be described below.

Figure 1:
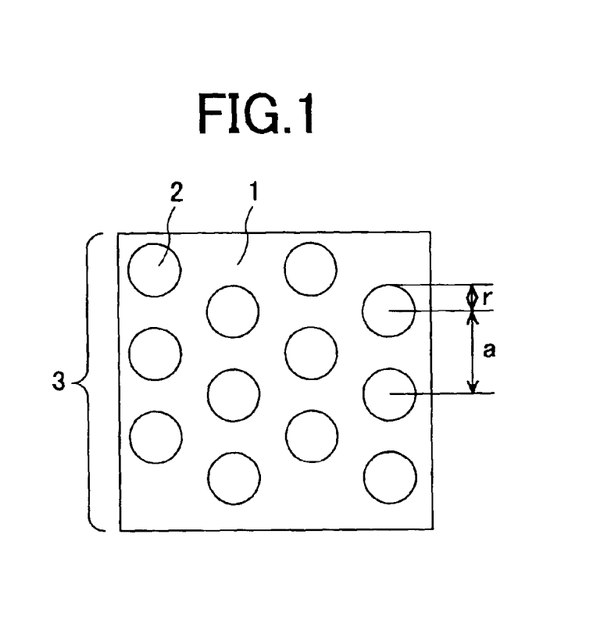
FIG. 1 shows two-dimensional air-hole triangular lattice photonic crystal structure.

First, referring to FIGS. 1 and 2, the variation of the effective refractive index of a photonic crystal by changing photonic crystal structure will be described. For photonic crystal structure, a two-dimensional photonic crystal 3 formed by an air-hole triangular lattice made of a medium having a high refractive index 1 and circular holes 2 shown in FIG. 1 is shown for an example. "r" denotes the radius of the circular hole and "a" denotes distance (a period) between the centers of circular holes.

Figure 2:
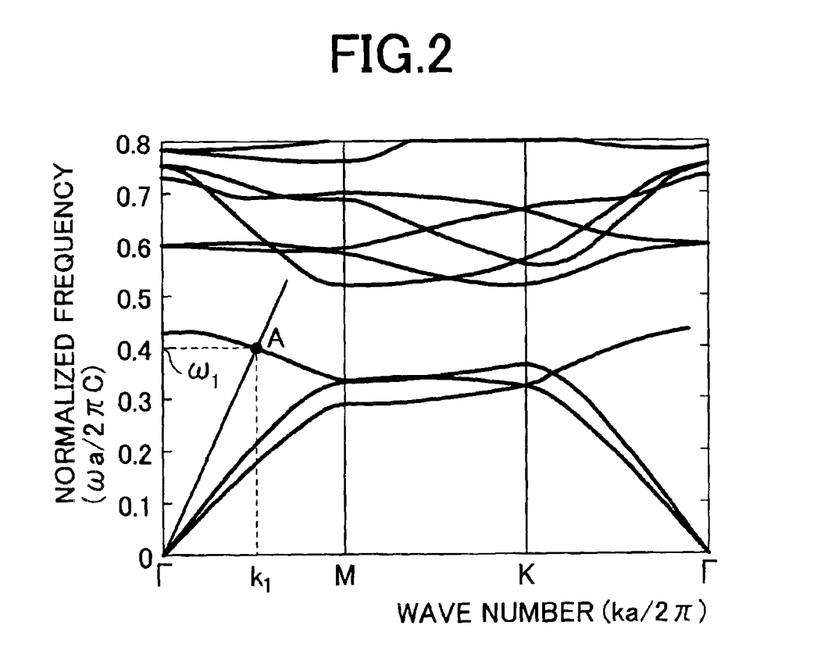
FIG. 2 shows the dispersion characteristic of a two-dimensional air-hole triangular lattice photonic crystal.

Dispersion relation showing relation between a frequency of light and a wave number in this case has a result shown in FIG. 2 (refer to "Photonic Crystals" written by J. D. Joannopoulos et al. and published in 1995 by Princeton University Press). An axis of ordinates shows a normalized angular frequency ($\omega a/2\pi c$). In this case, $\omega$ denotes an angular frequency, a denotes a period and c denotes the velocity of light in a vacuum. An axis of abscissas shows a normalized wave number ($ka/2\pi$). "Γ, M, K and L" are a symbol showing a vector of a wave number. The result is equivalent to a result in case the radius is 0.48a.

An effective refractive index n in relation to the following light when the light the angular frequency of which is $\omega_1$ for example is incident on the two-dimensional photonic crystal 3 composed of the air-hole triangular lattice is acquired by using the relation of $\omega_1/c=k_1/n$ from FIG. 2. In FIG. 2, "n" is acquired from the inverse number of the inclination of a straight line acquired by linking a point Γ and an intersection point A of $\omega_1 a/2\pi c$ and a dispersion curve by a straight line. The dispersion curve of the photonic crystal can be varied by changing "a" or "r" or the ratio of a and r. Therefore, in case an angular frequency is fixed, an effective refractive index for the angular frequency can be varied.

Figure 3:
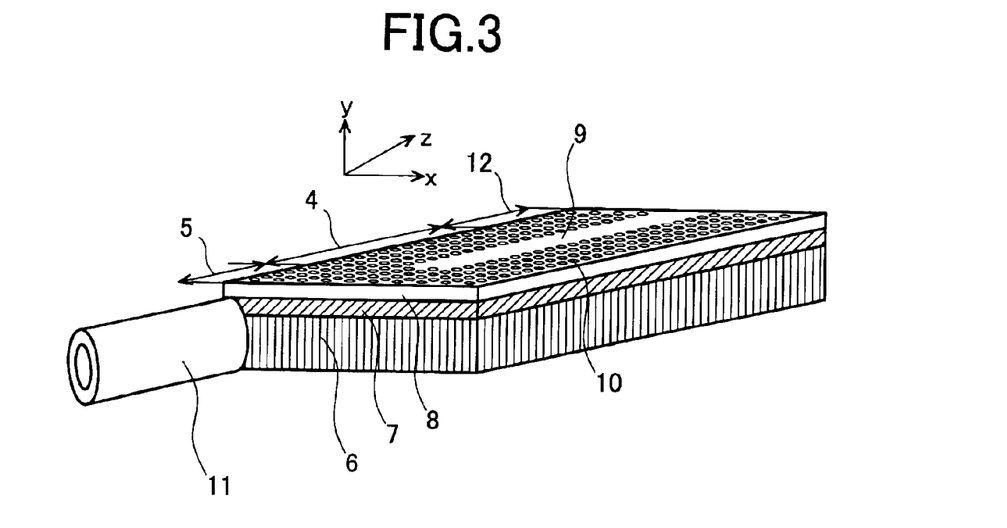
FIG. 3 is a single view drawing showing the configuration of a first embodiment of the invention.

FIG. 3 shows mode field diameter converting optical waveguide structure provided with a mode field diameter converter 4 in which the photonic crystal structure of the clad is spatially varied and an antireflection part 5 having photonic crystal structure. A reference number 9 in FIG. 3 denotes a line-defect waveguide.

An $Al_xGa_{1-x}As$ (x=0.35, thickness: 2 $\mu$m) clad layer 7 and an $Al_xGa_{1-x}As$ (x=0.12, thickness: 0.5 $\mu$m) core layer 8 are grown on a GaAs substrate 6 epitaxially. Next, air holes 10 periodically arranged are formed by dry etching using a mask formed by an $SiO_2$ film, and a mode field diameter converter 4 and the antireflection part 5 are produced.

Figure 4:
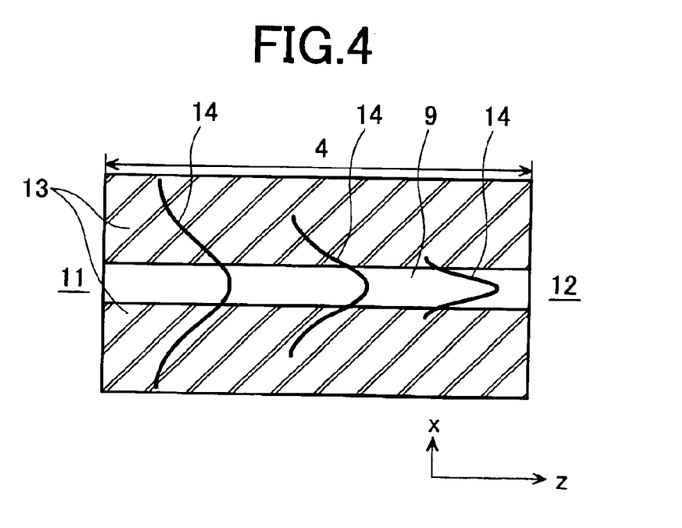
FIG. 4 is an explanatory drawing for explaining a top view of a mode field diameter converter.

First, the mode field diameter converter 4 will be described in detail. FIG. 4 shows the structure. The mode field diameter (optical waveguide mode electric field strength distribution) 14 of light incident from the side of an optical fiber 11 is converted so that the mode field diameter 14 is reduced, propagating the light on the side of a microoptical circuit 12 to be the mode field diameter of an optical waveguide mode of the microoptical circuit. Therefore, the effective refractive index of the clad is reduced as the light approaches the side of the microoptical circuit 12. A reference number 13 in FIG. 4 denotes a photonic crystal clad.

Figure 5:
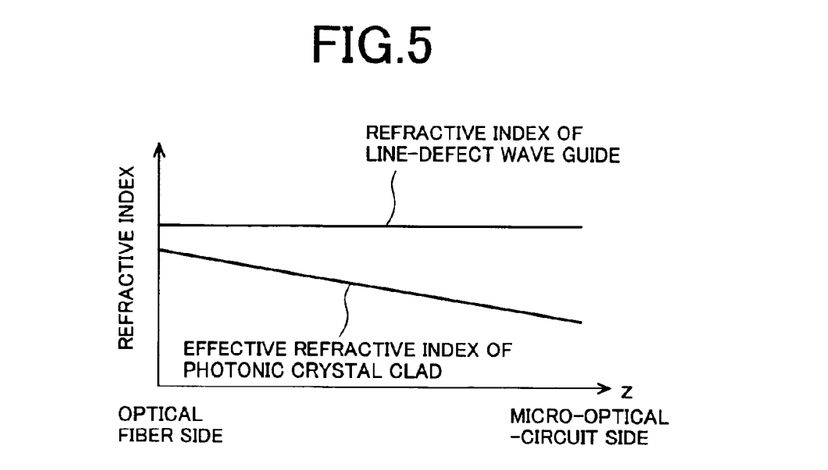
FIG. 5 is an explanatory drawing for explaining the spatial distribution of a refractive index of a clad of the mode field diameter converter.

In other words, as shown in FIG. 5, difference in a refractive index between the core and the clad increases (the confinement of the light is intensified) as the light approaches the side of the microoptical circuit. The spatial variation of the effective refractive index of the clad can be realized by spatially changing the periodic structure of photonic crystal structure.

Figure 6:
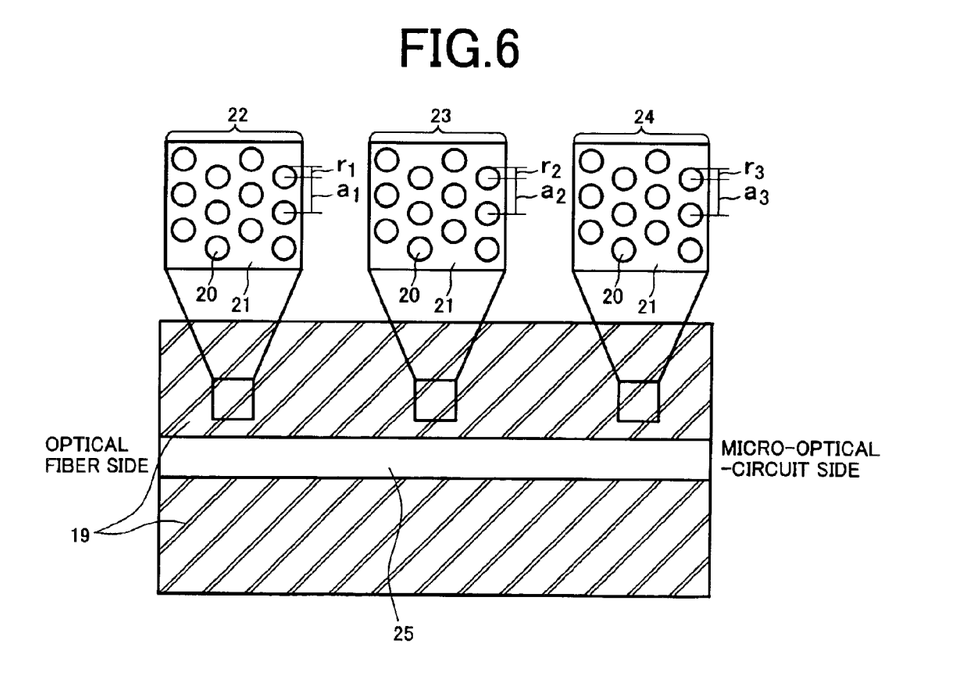
FIG. 6 is an explanatory drawing for explaining the structure of the photonic crystal clad of the mode field diameter converter.

Referring to FIGS. 6 and 7, a method of spatially changing the effective refractive index as shown in FIG. 5 will be described below. As shown in FIG. 6, the period a of the air-hole triangular lattice is extended from the optical fiber side to the microoptical circuit side. That is, $a_1<a_2<a_3$. The radius r of each air hole shall meet r/a=0.48. A reference number 19 in FIG. 6 denotes a photonic crystal clad, 20 denotes an air hole, 21 denotes a medium having a high refractive index, 22, 23 and 24 denote an air-hole triangular lattice and 25 denotes a line-defect waveguide.

Figure 7:
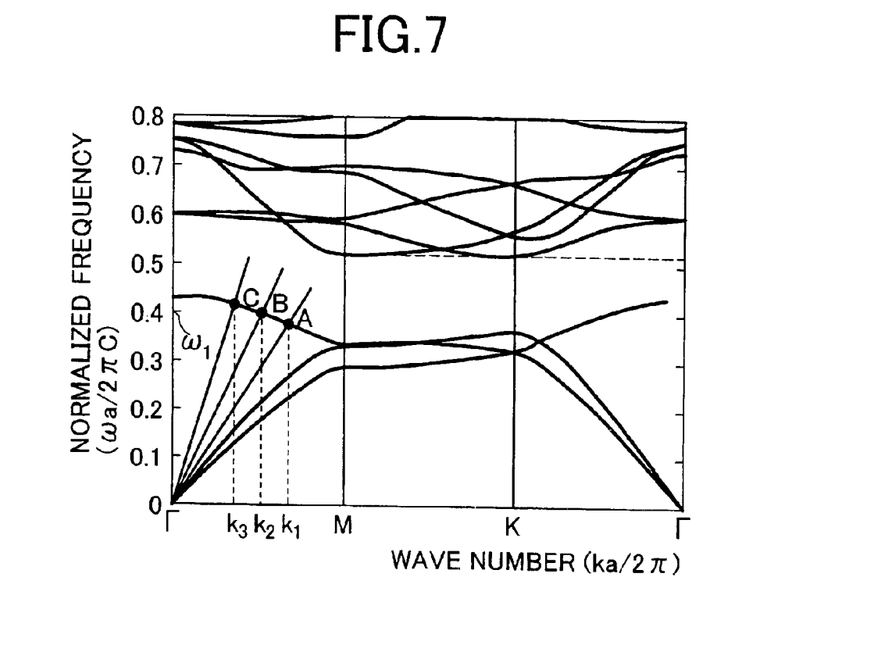
FIG. 7 is an explanatory drawing for explaining the dispersion characteristic of the two-dimensional air-hole triangular lattice photonic crystal shown in FIG. 6.

In this case, each effective refractive index of the air-hole triangular lattices 22, 23 and 24 for light having the same angular frequency is acquired based upon the inclination of a straight line acquired by linking the point Γ and each of A, B and C as shown in FIG. 7. Therefore, when the effective refractive index of the air-hole triangular lattices 22, 23 and 24 is respectively $n_{22}$, $n_{23}$ and $n_{24}$, the relation of $n_{22}<n_{23}<n_{24}$ is met.

Using such spatial variation of periodic structure, the variation of the effective refractive index shown in FIG. 5 is acquired. The method of spatially varying the effective refractive index by changing the period a in case r/a is fixed is described above, however, the similar method can be also realized even if the radius r of the air hole or r/a is changed.

Figure 8:
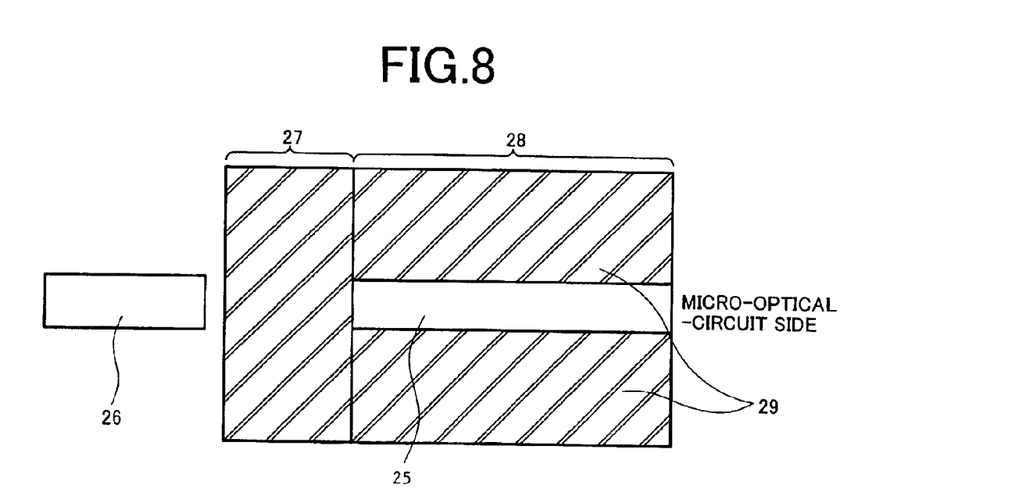
FIG. 8 is an explanatory drawing for explaining the function of an antireflection part.

Next, the antireflection part existing before the mode field diameter converter will be described referring to FIG. 8. In case light is incident on the interface of two media different in a refractive index, reflection is caused. In this case, in case light is incident onto a mode field diameter converter 28 from an optical fiber 26 via air, reflection is caused on the interface because the effective refractive index of the air and an optical waveguide mode of the mode field diameter converter 28 is different. A reference number 25 denotes a line-defect waveguide.

To prevent such reflection, an antireflection part 27 L in length having a refractive index of $n_1$ is required to be arranged between the air and the mode field diameter converter 28 so that the expressions (1) and (2) described above are met. "$n_0$" and "$n_2$" in the expressions (1) and (2) denote each effective refractive index of the air and an optical waveguide mode in the vicinity of the entry of the mode field diameter converter. In case the optical fiber is directly touched to a medium, $n_0$ is equal to the effective refractive index of an optical waveguide mode of the optical fiber.

The antireflection part 27 has photonic crystal structure. A reference number 29 in FIG. 8 denotes a photonic crystal clad. In the case of a photonic crystal, as the effective refractive index can be varied by changing periodic structure as described in the guideline of the design of the photonic crystal clad of the mode field diameter converter, it is easy to produce a medium that meets the expressions (1) and (2) which are respectively a condition of the antireflection part.

In this embodiment, the photonic crystal structure of the clad of the mode field diameter converter is limited to the air-hole triangular lattice in which holes are made in a two-dimensional slab-type waveguide, however, the method in this embodiment can be also applied to any other photonic crystal structure such as a cylinder type, a prism type and a three-dimensional wood pile type as it is.

Figure 9:
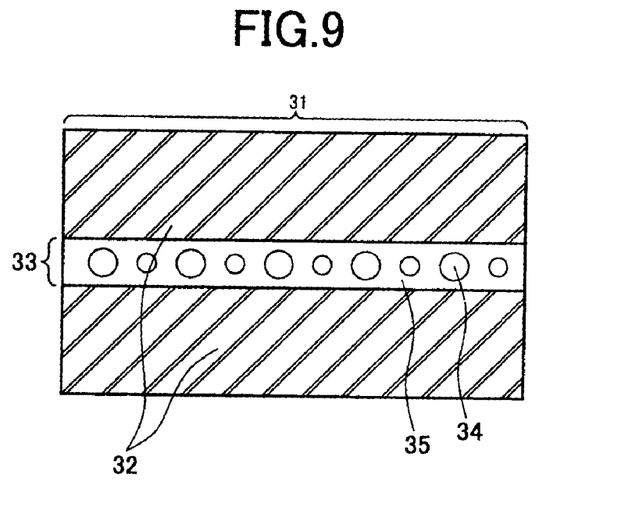
FIG. 9 shows an example of a coupled-defect waveguide.

For the core of the mode field diameter converter, the line-defect waveguide is described in this embodiment, however, a coupled-defect waveguide 33 shown in FIG. 9 may be also used. A reference number 31 in FIG. 9 denotes a mode field diameter converter, 32 denotes a photonic crystal clad, 34 denotes an air hole and 35 denotes a medium having a high refractive index.

In this embodiment, the AlGaAs semiconductor is used, however, another semiconductor, a dielectric or the combination of a semiconductor and a dielectric such as a silicon-on-insulator (SOI) wafer may be also used.

Second Embodiment

Figure 10:
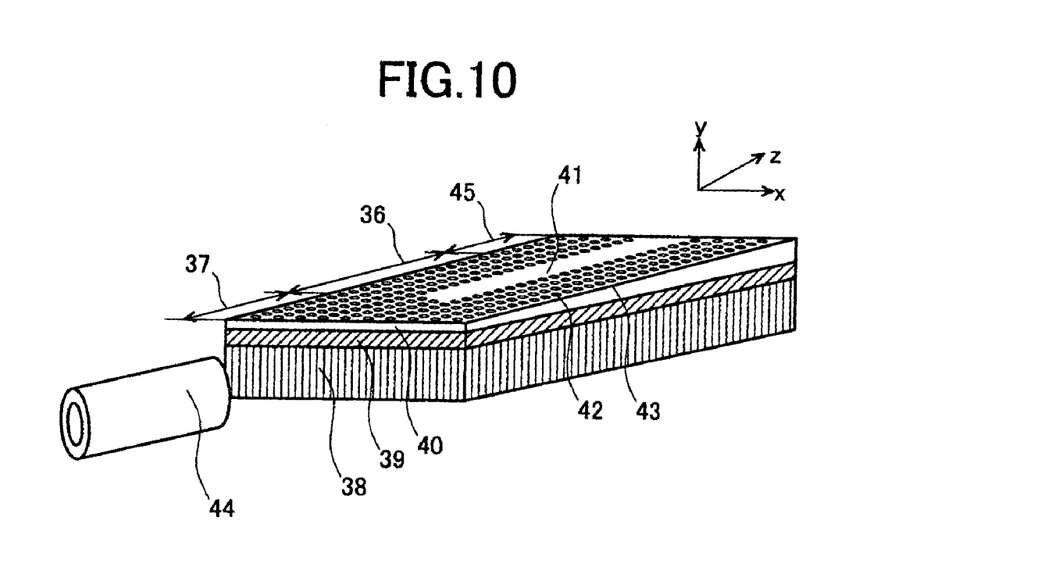
FIG. 10 is a single view drawing showing the configuration of a second embodiment of the invention.
Figure 11:
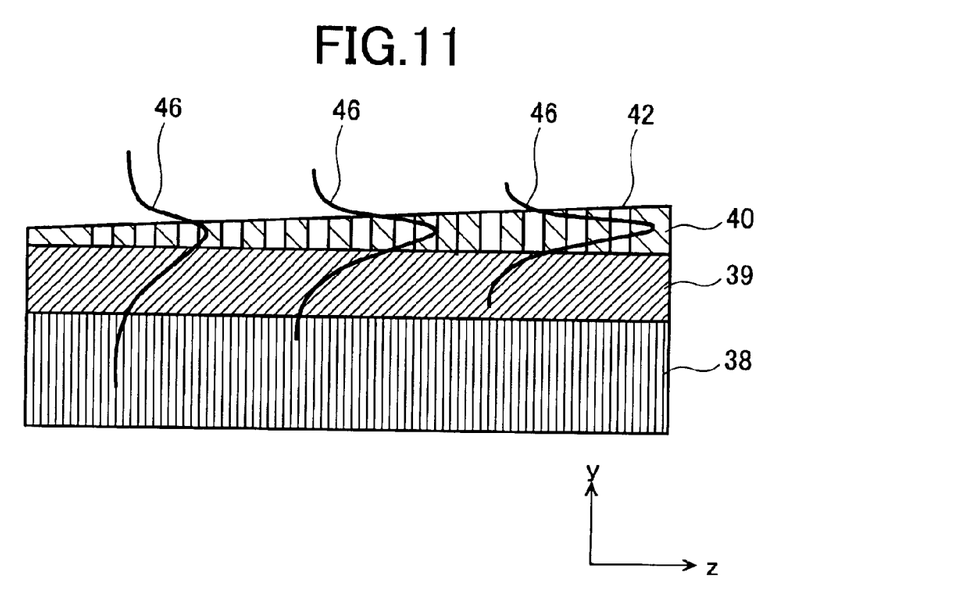
FIG. 11 is a sectional view showing the configuration of the second embodiment shown in FIG. 10.

In this embodiment, mode field diameter conversion structure for efficiently making mode field diameter conversion in a direction of the y-axis and more reducing a coupling loss with an optical fiber respectively by inserting a tapered core into the mode field diameter conversion structure described in the first embodiment will be described referring to FIGS. 10 and 11. FIG. 10 is a single view drawing and FIG. 11 is a sectional view.

An $Al_xGa_{1-x}As$ (x=0.35, thickness: 2 μm) clad layer 39 is grown on a GaAs substrate 38 epitaxially. Next, an $Al_xGa_{1-x}As$ (x=0.12, thickness: 0.5 μm) tapered core layer 40 is grown epitaxially using selective growth technology.

Next, dry etching is made using a mask made of a $SiO_2$ film and a pattern having air holes 42 shown in FIG. 10 (depth: 0.5 μm or more) formed in a medium having a high refractive index 43 is produced. The pattern having the air holes 42 of a mode field diameter converter 36 is designed to eliminate a loss by conversion so that adiabatic mode conversion in which a fundamental mode is always maintained is made.

In the mode field diameter converter 36, the effective refractive index of a clad of a line-defect waveguide 41 is reduced by changing the size of the air hole 42 or distance between the air holes. Hereby, the confinement of light in the clad (the confinement of light in a direction of the x-axis) is intensified, a mode field diameter 46 is reduced as light is propagated and approximates the size of the mode field diameter of a microoptical circuit 45. As the core closer to the microoptical circuit becomes thicker, the confinement of light in the direction of the y-axis also becomes intenser, as shown in FIG. 11, the mode field diameter 46 in the direction of the y-axis is also reduced and approximates a mode field diameter on the side of the microoptical circuit 45. An antireflection part 37 located on the side of the optical fiber 44 is produced according to the method described in the first embodiment.

In this embodiment, the photonic crystal structure of the clad of the mode field diameter converter is limited to an air-hole-type photonic crystal acquired by making the holes in a two-dimensional slab-type waveguide, however, the method in this embodiment can be also applied to any other photonic crystal structure such as a cylinder type, a prism type and a three-dimensional wood pile type as it is. For the core of the mode field diameter converter, the line-defect waveguide is used in this embodiment, however, a coupled-defect waveguide may be also used.

In this embodiment, the AlGaAs semiconductor is used, however, another semiconductor, a dielectric or the combination of a semiconductor and a dielectric (an SOI wafer) may be also used.

Third Embodiment

In this embodiment, mode field diameter conversion structure acquired by inserting a tapered core in a direction of the x-axis into the mode field diameter conversion structure described in the first embodiment will be described below, referring to FIG. 12.

Figure 12:
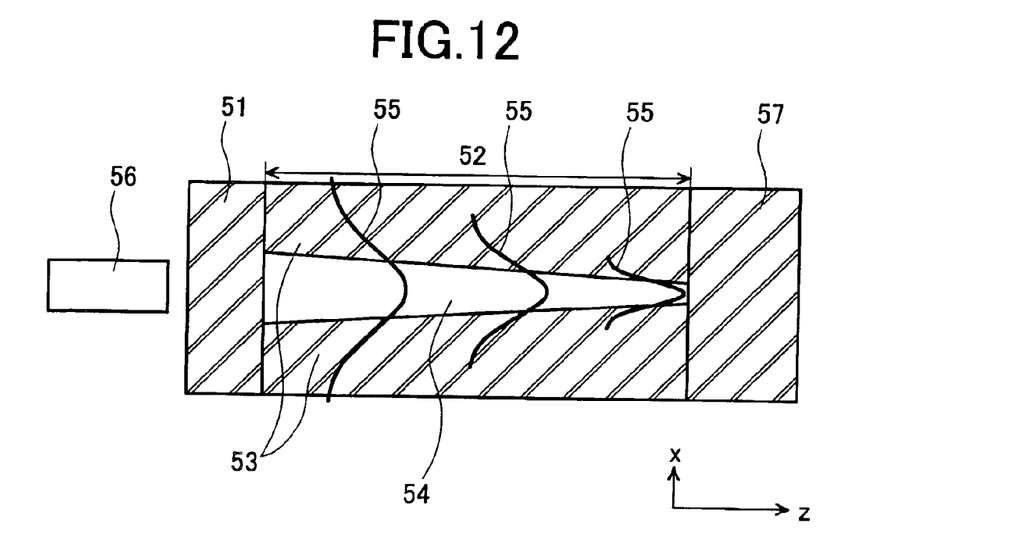
FIG. 12 is an explanatory drawing for explaining the configuration of a third embodiment of the invention.

FIG. 12 is a top view. In this embodiment, the structure described in the first or second embodiment is also produced. In a mode field diameter converter 52, dry etching is made using a mask made of an $SiO_2$ film and a photonic crystal clad 53 and a tapered line-defect waveguide 54 are produced. Photonic crystal structure is the same as that used in the first embodiment and the effective refractive index is reduced from an optical fiber 56 to a microoptical circuit 57. The width of the tapered line-defect waveguide 54 is reduced from the optical fiber 56 to the microoptical circuit 57. Therefore, the confinement of light in a direction of the x-axis becomes intenser, as shown in FIG. 12, a mode field diameter 55 in the direction of the x-axis also becomes smaller and approximates a mode field diameter on the side of the microoptical circuit 57. An antireflection part 51 is produced according to the method described in the first embodiment.

For the photonic crystal structure of the clad of the mode field diameter converter, an air-hole photonic crystal in which holes are made in a two-dimensional slab-type waveguide or any other photonic crystal structure such as a cylinder type, a prism type and a three-dimensional wood pile type may be used. For the core of the mode field diameter converter, the line-defect waveguide is described in this embodiment, however, a coupled-defect waveguide can be also used. Further, the AlGaAs semiconductor is used, however, another semiconductor, a dielectric or the combination of a semiconductor and a dielectric (an SOI wafer) may be also used.

Fourth Embodiment

Figure 13:
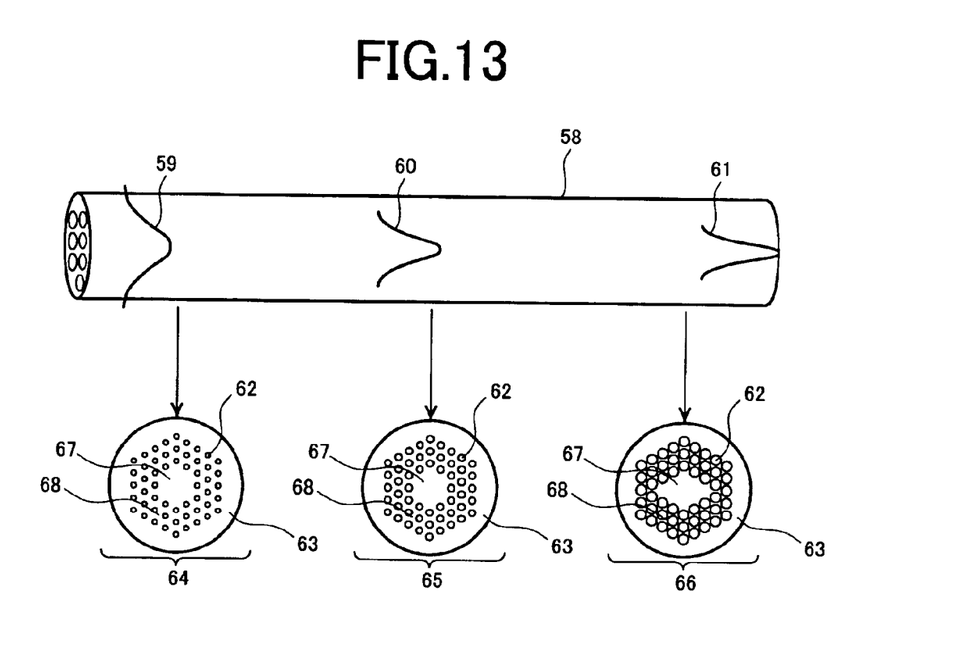
FIG. 13 is an explanatory drawing for explaining the configuration of a fourth embodiment of the invention.

In this embodiment, referring to FIG. 13, a mode field diameter converting optical fiber will be described.

The basic structure of a mode field diameter converting optical fiber 58 is composed of a core 67 made of a dielectric (for example, silica) and a clad 68 made of a dielectric 63 and having air holes 62. As the period or the size of the air hole 62 in the clad 68 spatially varies in a direction in which light is propagated as shown on the cross sections 64, 65 and 66 of the optical fiber in FIG. 13, difference in a refractive index between the core 67 and the clad 68 spatially varies. As a result, the intensity of the confinement of light in the direction in which light is propagated and in its perpendicular direction varies and the size of a mode field diameter can be converted as shown by 59, 60 and 61 in FIG. 13.

In this case, differently from the mode field diameter converter in which the clad layer and the core layer of the airy silica fiber described on the 52nd page, vol. 13 of IEEE Photonic Technology Letters (2001) are both tapered, as only a fundamental mode exists in the whole fiber, no loss is caused by excitation in a higher order mode.

Figure 14:
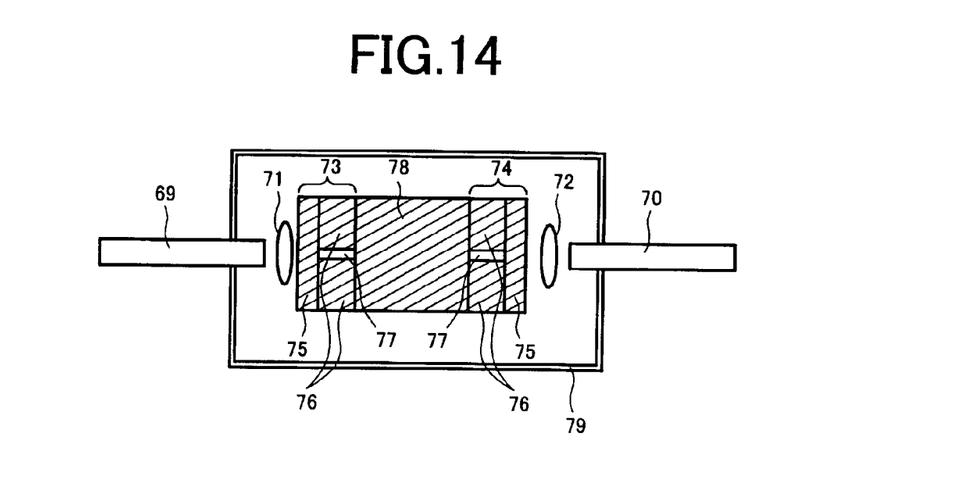
FIG. 14 is an explanatory drawing for explaining one example of an optical module using the invention.

Next, one example of a microoptical circuit provided with a mode field diameter converter provided with an antireflection part according to the invention and an optical module on the input side and the output side of which an optical fiber is optically coupled will be described referring to FIG. 14.

The optical module is composed of optical fibers 69 and 70 used for inputting/outputting light, lenses 71 and 72 for converging, mode field diameter converters 73 and 74 provided with an antireflection part 75 on the input/output sides, a microoptical circuit 78 and a package 79 for housing them. In each of the mode field diameter converters 73 and 74 provided with the antireflection part, a photonic crystal clad 76, a line-defect waveguide 77 and the antireflection part 75 are included and the method described in the first, second or third embodiment can be applied as it is.

In this case, for optical coupling between each optical fiber 69, 70 and each mode field diameter converter provided with antireflection part 75, each lens 71, 72 is used, however, for a method using no lens, there is a method of using a lensed optical fiber or a method of directly touching the optical fiber to the mode field diameter converter provided with the antireflection part 75.

Figure 15:
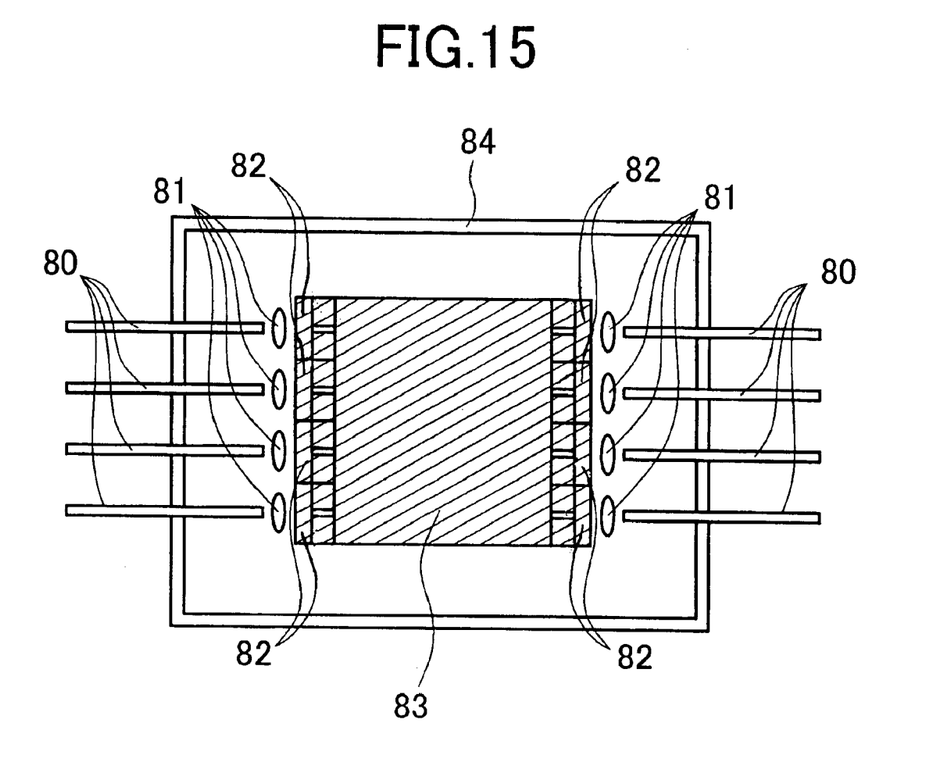
FIG. 15 is an explanatory drawing for explaining another example of the optical module using the invention.

Next, another example of a microoptical circuit provided with plural mode field diameter converters provided with each antireflection part according to the invention and an optical module on the input/output sides of which plural optical fibers are optically coupled will be described referring to FIG. 15.

The optical module is composed of plural optical fibers 80 used for inputting/outputting light, plural lenses 81 for converging light from each optical fiber, plural mode field diameter converters 80 provided with each antireflection part on the input or output side, a microoptical circuit 83 and a package 84 for housing them. In each mode field diameter converter provided with the antireflection part 82, a photonic crystal clad, a line-defect waveguide and the antireflection part are included and the method described in the first, second or third embodiment can be applied as it is.

In this case, for optical coupling between the optical fiber 80 and the mode field diameter converter provided with antireflection part 82, the lens 81 is used, however, for a method using no lens, there is a method of using a lensed optical fiber or a method of directly touching the optical fiber to the mode field diameter converter provided with the antireflection part 82.

Figure 16:
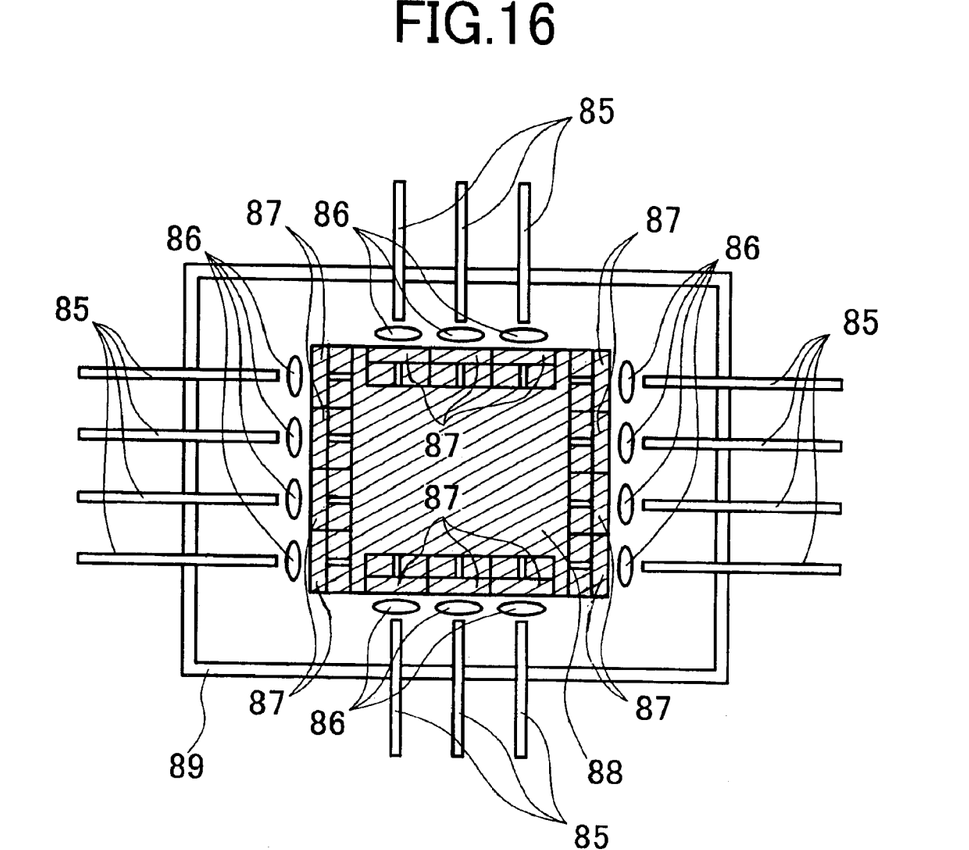
FIG. 16 is an explanatory drawing for explaining further another example of the optical module using the invention.

Next, further another example of a microoptical circuit provided with plural mode field diameter converters provided with each antireflection part in a two-dimensional array according to the invention and an optical module on the input/output sides of which plural optical fibers are optically coupled will be described referring to FIG. 16.

The optical module is composed of plural optical fibers 85 in a two-dimensional array used for inputting/outputting light, plural lenses 86 for converging light from each optical fiber, plural mode field diameter converters provided with each antireflection part 87 provided on the input/output sides in the two-dimensional array, a microoptical circuit 88 and a package 89 for housing them. In each mode field diameter converter provided with the antireflection part 87, a photonic crystal clad, a line-defect waveguide and the antireflection part are included and the method described in the first, second or third embodiment can be applied as it is.

In this case, for optical coupling between the optical fiber 85 and the mode field diameter converter provided with the antireflection part 87, the lens 86 is used, however, for a method using no lens, there is a method of using a lensed optical fiber or a method of directly touching the optical fiber to the mode field diameter converter provided with the antireflection part 87.

Figure 17:
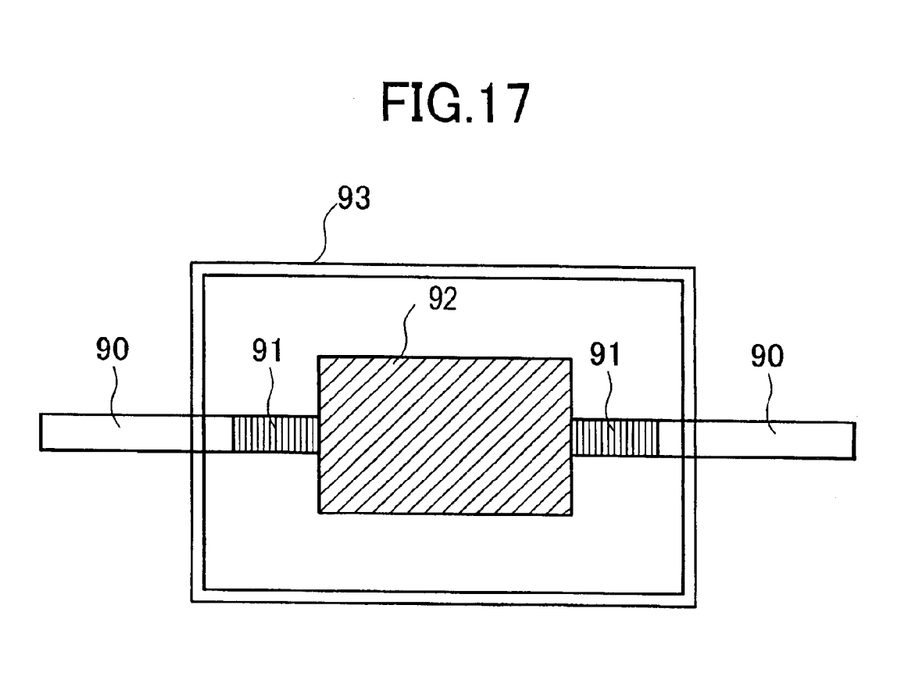
FIG. 17 is an explanatory drawing for explaining one example of an optically coupled module using the invention.

Next, an example of an optical coupling module including an optical fiber and a microoptical circuit using the mode field diameter converting optical fiber equivalent to the fourth embodiment will be described referring to FIG. 17.

The optical coupling module is composed of an optical fiber 90 used for inputting/outputting light, a mode field diameter converting optical fiber 91 connected to the optical fiber 90, a microoptical circuit 92 and a package 93 for housing them.

Figure 18:
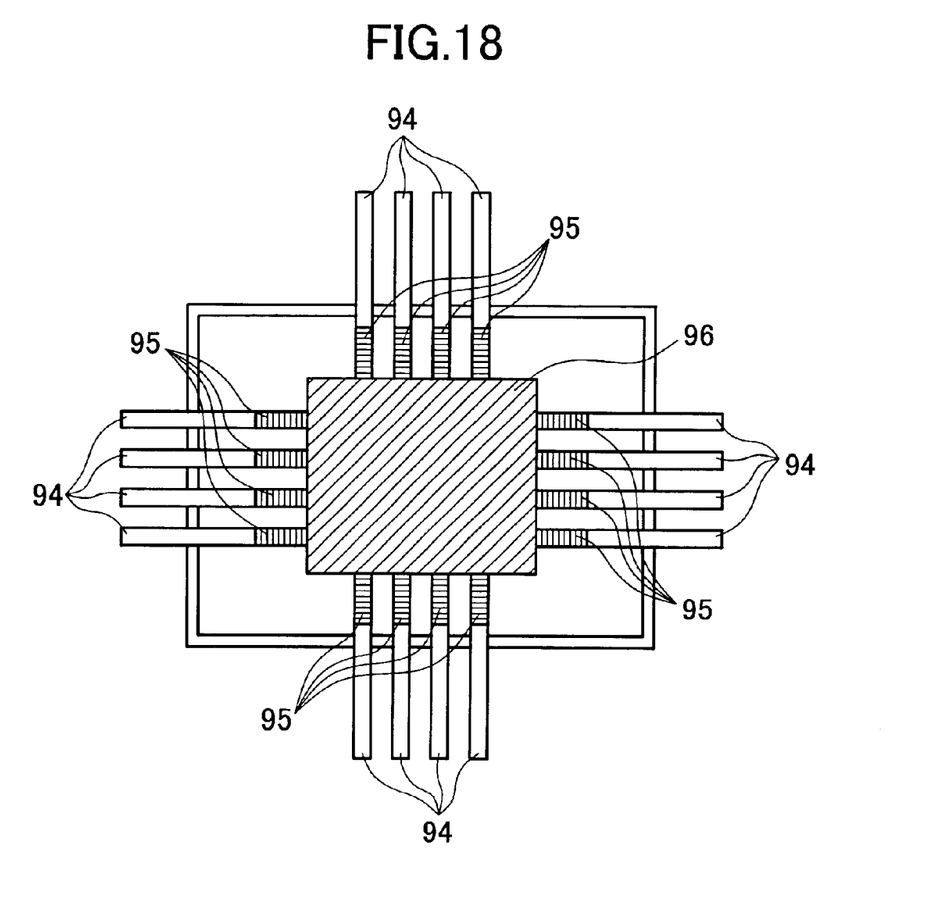
FIG. 18 is an explanatory drawing for explaining another example of the optically coupled module using the invention.

Further, an example provided with inputting/outputting optical fibers in a two-dimensional array in the optical coupling module shown in FIG. 17 will be described referring to FIG. 18.

The optical coupling module is composed of plural optical fibers 94 used for inputting/outputting light, plural mode field diameter converting optical fibers 95 connected to these optical fibers 94, a microoptical circuit 96 and a package 97 for housing them.

As described above, according to the invention, the reduction of the coupling loss caused by difference in the size of a mode field diameter between optical waveguide modes different in the mode field diameter and the coupling loss caused by reflection on a boundary caused by the difference of media is realized using the same working technique and technique for also reducing the coupling loss caused by excitation in a higher order optical waveguide mode can be realized.

The invention realizes the optical waveguide for enabling the reduction of the coupling loss caused by difference in the size of a mode field diameter between optical waveguide modes different in the mode field diameter and the coupling loss caused by reflection on a boundary caused by the difference of media and the optical device using the optical waveguide.

What is claimed is:

1. An optical waveguide, comprising:
    a core; and
    a clad provided with a photonic crystal structure,
    wherein the photonic crystal structure of the clad is formed by a two-dimensional photonic crystal provided with a plurality of circular holes in which (r) denotes a radius of the circular hole and (a) denotes a distance between centers of the circular holes, and the effective refractive index of the clad is spatially varied by one of (A) changing the distance (a) from a region having a large mode field diameter to a region having a small mode field diameter when (r/a) is fixed, and (B) changing the radius (r) of the circular hole or the (r/a) from the region having the large mode field diameter to the region having the small mode field diameter, and by thickening the core from the region having the large mode field diameter to the region having the small mode field diameter.

2. The optical waveguide according to claim 1, wherein the effective refractive index of the clad is spatially varied by changing the distance (a) from the region having a large mode field diameter to the region having the small mode field diameter when (r/a) is fixed.

3. The optical waveguide according to claim 1, wherein the effective refractive index of the clad is spatially varied by changing the radius (r) of the circular hole or the (r/a) from the region having the large mode field diameter to the region having the small mode field diameter.

4. An optical device, comprising:

an antireflection part;

a microoptical circuit; and an intermediate member provided for transmitting light from the antireflection part to said microoptical circuit and comprises a core and a clad having photonic crystal structure, wherein the photonic crystal structure of the clad is formed by a two-dimensional photonic crystal provided with a plurality of circular holes in which (r) denotes a radius of the circular hole and (a) denotes a distance between centers of the circular holes, and the effective refractive index of the clad is spatially varied by one of (A) changing the distance (a) from the antireflection part to the microoptical circuit when (r/a) value is fixed and (B) by changing the radius (r) of the circular hole or the (r/a) value from the antireflection part to the microoptical circuit and by thickening the core from the antireflection part to the microoptical circuit.

5. The optical waveguide according to claim 4, wherein the effective refractive index of the clad is spatially varied by changing the distance (a) from the antireflection part to the microoptical circuit when (r/a) value is fixed.

6. The optical waveguide according to claim 4, wherein the effective refractive index of the clad is spatially varied by thickening the core from the antireflection part to the microoptical circuit.

* * * * *